May 8, 1928.
L. B. HARMON
MOTOR VEHICLE LICENSE CLAMP
1,668,962
Filed Nov. 8, 1926
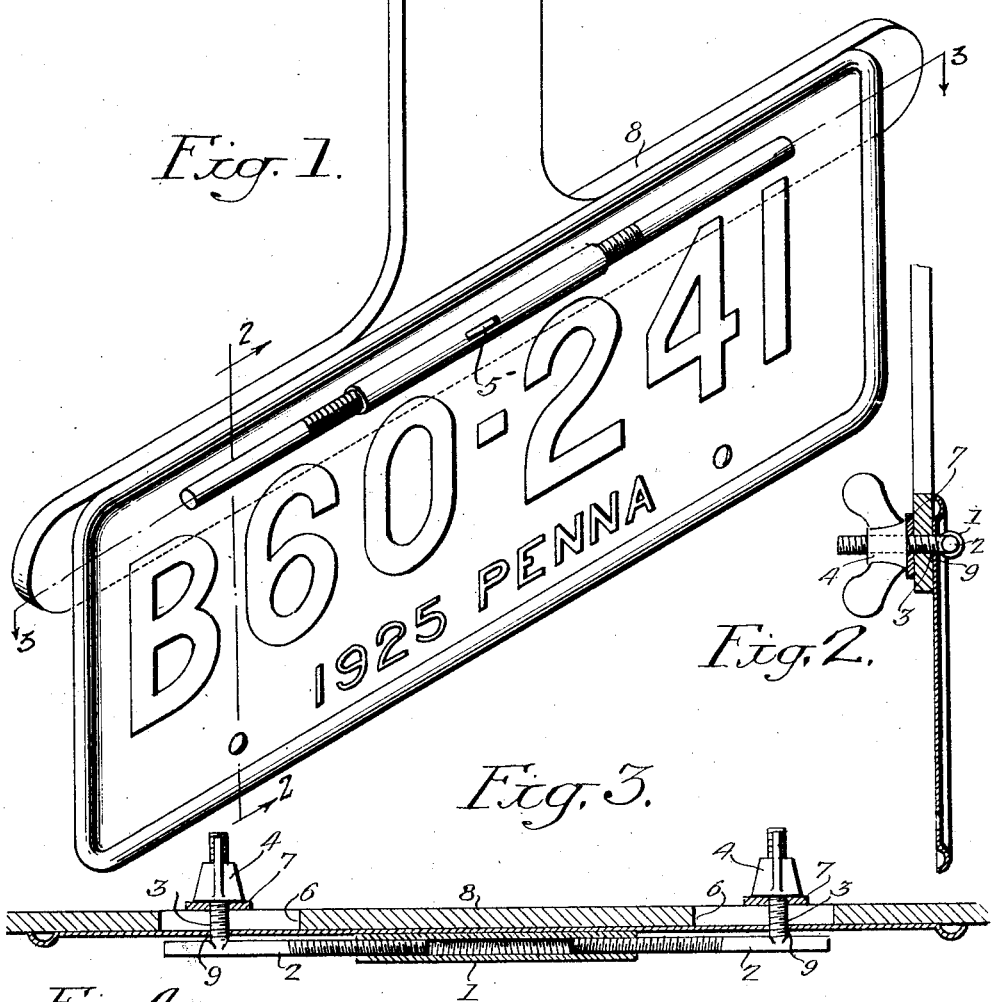
Fig. 1.
Fig. 2.
Fig. 3.
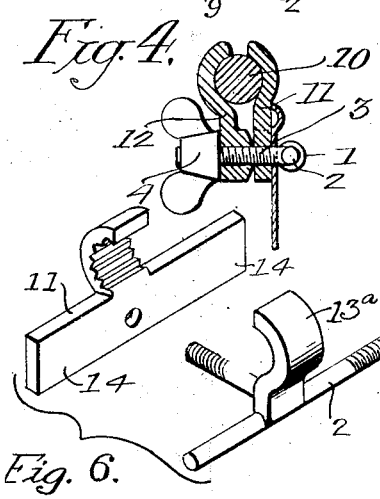
Fig. 4.
Fig. 6.
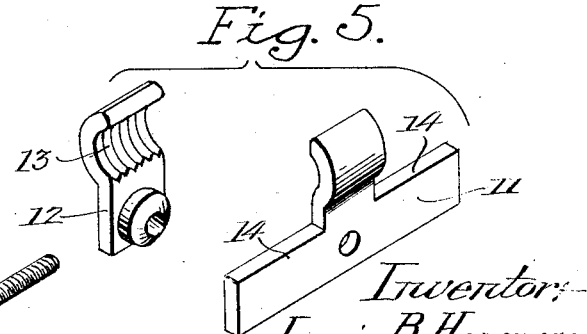
Fig. 5.
Inventor:
Louis B. Harmon
by his Attorneys
Howson & Howson Patented May 8, 1928.

1,668,962

UNITED STATES PATENT OFFICE.

LOUIS B. HARMON, OF PHILADELPHIA, PENNSYLVANIA.

MOTOR-VEHICLE-LICENSE CLAMP.

Application filed November 8, 1926. Serial No. 147,025.

This invention relates to improvements in devices for attaching license plates to motor vehicles, the principal object of the invention being to provide a novel clamp readily adjustable to fit the various licenses and clamping brackets and easily applied to, and detached from, any type of bracket or bar provided as a support for the license plate.

Another object of the invention is to provide a clamp affording a relatively extended supporting bearing for the license plates and gripping the latter at points other than directly at the apertures in the plates through which the clamping devices project.

These and other useful ends hereinafter appearing I accomplish by means of the novel structural features illustrated in the attached drawings, in which:

Figure 1 is a view in perspective of a part of a common form of license bracket to which the license is secured by means of a clamp made in accordance with the present invention;

Fig. 2 is a section on the line 2—2, Fig. 1;
Fig. 3 is a section on the line 3—3, Fig. 1;
Fig. 4 is a sectional view similar to that of Fig. 2 but illustrating a modification within the scope of the invention;

Fig. 5 is a view in perspective of the special clamping elements forming a part of the device shown in Fig. 4, and Fig. 6 is a view in perspective showing a further modification in which one of the clamping elements is an integral part of the major clamping device.

With reference to the drawings, the device in a preferred embodiment comprises an internally threaded sleeve 1 and a pair of rods 2, 2, each threaded at one end for entrance into the ends of the sleeve 1 and each having at or near its other end a transverse extension 3 threaded for reception of a wing or other suitable nut 4. As shown in Fig. 3, the opposite ends of the sleeve 1 are reversely threaded so that with the rods 2 held against rotation, rotation of the sleeve 1, as for example by means of a suitable instrument inserted in a slot 5 provided for the purpose, results in the simultaneous separation or drawing together of the said rods.

The clamp is applied to the license plate by inserting the extensions 3 in the apertures in the license plate provided for the securing bolts commonly employed, the clamp being adjustable as described above to adapt it to the varying distances between the said apertures. Where a bracket such as illustrated in Fig. 1 is provided for the license plate, the extensions 3 are then inserted through the slotted apertures 6 in the bracket, shown in Figs. 2 and 3, after which the wing nuts are applied to secure the parts to the bracket. Preferably washers 7 are placed between the back of the bracket and the nuts 4. It will be noted that when thus applied, the sleeve 1 bears against the front face of the plate, and when the nuts 4 are tightened up, the plate is securely clamped between the sleeve and the bracket. Thus the license plate is supported not only at the apertures 9 through which the extensions 3 project, but is also securely clamped intermediate the apertures so that no excessive strain comes at the apertures. Also where the rods 2 are of sufficient flexibility, tightening of the nuts 4 will cause them to spring backwardly against the face of the license and provide a further clamp independent of the apertures.

In Figs. 4 and 5, I have illustrated a device which adapts this type of clamp to plate supporting means including a horizontal rod or bar 10. In this instance, I provide a pair of clamping elements 11 and 12, see Fig. 5, which as shown in Fig. 4 are applied to the projections 3 behind the plate, these clamps embracing the supporting bar 10 as shown to hold the license in place. The bar-engaging inner faces 13 of the clamps are preferably knurled or serrated to provide a more secure grip, and the clamp 11 which bears against the rear face of the license plate preferably is provided with transverse wings 14 which afford a wide bearing between which and those parts of the clamp which bear against the forward face of the license plate the latter is securely held entirely independent of the apertures in the plate through which the extensions 3 project.

In Fig. 6, I have illustrated a modification of the device shown in Figs. 4 and 5. In this instance the clamping element 13ª corresponding with the element 13 previously described is formed integrally with the member 2. The clamp 11 is retained and occupies a position against the back of the license plate so that the plate is clamped between the rod 2 and the extensions 14 on the said clamp. This modification eliminates one of the separate parts of the device shown in Figs. 4 and 5.

The clamp preferably is made entirely of brass, and may be nickel-plated or enameled or merely polished as desired. There is, therefore, no tendency toward corrosion and rust tending to render removal difficult. The device is both ornamental and highly efficient and satisfactory in all respects.

I claim:

1. A clamp for the license tags of motor vehicles comprising an elongated element adjustable as to length and having relatively movable transverse threaded extensions, with nuts for application to said threaded extensions.

2. A clamp for the license plates of motor vehicles comprising an internally threaded sleeve, rods having one end threaded for entrance into the ends of said sleeves, and each of said rods having also transverse threaded extensions with nuts on said extensions.

3. A clamp for the license plates of motor vehicles comprising an elongated member adjustable as to length and including relatively adjustable threaded transverse extensions, nuts on said extensions, and clamping elements on said extensions confined by said nuts.

4. A clamp for the license plates of motor vehicles comprising an elongated member adjustable as to length and including relatively adjustable threaded transverse extensions, nuts on said extensions, and clamping elements carried by said member in relatively adjustable and opposed pairs, with at least one element of a pair mounted on the respective extensions and adapted to be pressed towards its companion element by the associated nut.

5. A clamp for the license plates of motor vehicles comprising an elongated member adjustable as to length and including relatively adjustable threaded transverse extensions, nuts on said extensions, and clamping elements carried by said member and arranged in relatively adjustable and opposed pairs, one element of a pair being mounted on the respective extensions and being adapted to be pressed towards its companion element by the associated nut, and one of said elements of each pair also having transverse wings providing an extended bearing for the license plate.

LOUIS B. HARMON.